Reissued Apr. 20, 1926. Re. 16,331

UNITED STATES PATENT OFFICE.

HARRY B. GOODWIN, OF GRAND JUNCTION, COLORADO, ASSIGNOR TO THE LATIMER CHEMICAL COMPANY, A CORPORATION OF COLORADO.

ARSENATE OF LEAD.

No Drawing. Original No. 1,322,008, dated November 18, 1919, Serial No. 248,343, filed August 5, 1918. Application for reissue filed November 8, 1921. Serial No. 513,847.

*To all whom it may concern:*

Be it known that I, HARRY B. GOODWIN, a citizen of the United States, a resident of Grand Junction, county of Mesa, and State of Colorado, have invented certain new and useful Improvements in Arsenate of Lead, of which the following is a specification.

Arsenate of lead is used generally for the killing or elimination of various insects enemies to various forms of vegetation and finds a large use to this end in orchards. It has now become a common practice to spray arsenate of lead onto fruit trees which, without some treatment, may be subject to an injurious attack by various insects. The insects commonly attack both the leaf and the fruit. They are sometimes very small, being almost invisible to the naked eye, and it is nearly impossible to locate them on the trees. It becomes necessary therefore, to cover both the trees and their foliage with some material poisonous to the insects. Arsenate of lead is generally admitted to be very efficient for this end and it is commonly used by orchard owners and recommended by scientists.

Arsenate of lead is offered commercially in two forms, paste and powdered. While the paste form has been found efficient as an insecticide, it is difficult to produce a product in the paste form that will stay uniform until it is used. Arsenate of lead in the powdered form is, therefore, being more generally used.

When used for spraying fruit trees 1 pound of arsenate of lead powder is generally added to 50 gallons of water. The arsenate of lead does not dissolve in the water but is held in suspension in it and the physical mixture of water and arsenate of lead is then passed through spraying apparatus and so distributed on the trees. The water evaporates leaving the arsenate of lead adhering to the trees where it may be found and consumed by the insects to be destroyed. In order to get satisfactory results from the arsenate of lead treatment it is necessary to have the poison thoroughly distributed over the trees. So that the poison may be readily available to the insect it should be in very fine particles on the trees. It will be apprehended that in order to get the arsenate of lead thoroughly distributed on the trees it is necessary to have it more or less uniformly suspended in the water in the spraying tank—and in the water as it is delivered by the spray to the trees. It is the desire of the manufacturer of arsenate of lead, therefore, to produce a product which may readily be suspended in water and which when mixed with water, will remain in suspension. To this end much effort has been devoted to producing arsenate of lead in a fine impalpable powder. To a limited degree these efforts have been succcessful and there are on the market powdered arsenates of lead which may be added to water and by agitation thoroughly mixed and gotten in suspension. Prior to my invention there has been no arsenate of lead which would remain in suspension for long under commercial conditions or in the proportions usually employed for spraying.

It is the object of my invention to provide an arsenate of lead composition which will not only readily become suspended in water but will remain suspended in the water for a considerable period of time under ordinary conditions and when added to water in the proportions generally adopted for spraying.

While not necessarily confined to such material I prefer to employ an arsenate of lead produced by mixing lead acetate—$Pb(C_2H_3O_2)_2$—and arsenic acid—$H_3AsO_4$—which, by the process I employ, produces a very fine precipitate of arsenate of lead. I find that arsenate of lead so produced may be added to water in the proportion of 1 pound of arsenate of lead to 50 gallons of water and very readily and thoroughly mixed therein in such a way that the arsenate of lead becomes evenly and uniformly suspended throughout the water.

A settling test commonly employed by manufacturers and in laboratories is to add 15 grams of dry material to 250 cubic centimeters of water and after properly agitating to get all the material in suspension in the water, to let rest quiet and then measure the amount of clear water at the top of the column at the end of five minutes, and again at the end of ten minutes. This is a convenient and easy test but it does not simulate practical conditions for the reason that the ratio of 15 grams to 250 cubic centimeters of water is equivalent of 25 pounds to 50 gallons. The usual orchard strength of arsenate of lead mixture is only 1 pound of powder to 50 gallons of water. Moreover, the clear water proportion in the top of the scale is not of as much importance as the general distribution of material throughout the body of liquid. For instance it may happen that only 5 per cent of liquid will be clear whereas 60 per cent or 75 per cent of the material may have already settled to the bottom 10 per cent of the liquid leaving only a small proportion of the material distributed throughout the liquid.

In order, therefore, to determine the condition existing under circumstances such as are met in practical use of arsenate of lead as an insecticide, I have made a test by mixing a sample of arsenate of lead in the proportion of 1 pound of the powder arsenate of lead to 50 gallons of water. After thoroughly mixing, agitating, and getting substantially all of the arsenate of lead in suspension in the water, it was allowed to remain quiet for five minutes at the end of which time the upper half of the liquid and the arsenate of lead suspended therein was siphoned off from the top of the vessel into a weighed dish. The liquid so siphoned off was then evaporated to dryness and the residue weighed. One half of the weight of the entire quantity of arsenate of lead suspended originally was then divided into the weight of the dried residue remaining in the dish. This gives the per cent of arsenate of lead remaining in suspension in the upper half of the liquid. By repeating the test and letting the mixture rest quiet for longer periods it is possible to obtain information of practical value concerning the continuance of suspensibility of the arsenate of lead in water.

In the particular sample tested I find that there still remained in suspension in the upper half of the fluid at the end of 5 minutes 31.91 per cent of the arsenate of lead. At the end of 10 minutes there remained suspended in the upper half only 10.04 per cent. At the end of 20 minutes there remained suspended 8.25 per cent. At the end of 40 minutes 6.16 per cent. At the end of 80 minutes 1.87 per cent. The same material when tested by the ordinary method of adding 15 grams to 250 cubic centimeters of water showed at the end of 5 minutes only 2 cubic centimeters of clear water and at the end of 10 minutes only 4 cubic centimeters of clear water which figures indicate that, according to the ordinary method of testing, it is a product of very high quality—and indeed it is the best product I can find on the market.

I find that if I add to the arsenate of lead used in the above test a quantity of commercial tannin I obtain a much superior suspensibility. The tannin which I have used is the brown powder of commerce produced from the bark of chestnut trees, commercially known as "Chestnut B" but this specific kind of tannin is not essential to my invention. The exact proportion of tannin to arsenate of lead is not material, although I have found ½ of 1 per cent of tannin satisfactory but the quantity may be varied within wide limits as I have gotten good results with less than ½ of 1 per cent and again with as much as 10 per cent or more. I find however, that a mixture of ½ of 1 per cent of tannin is sufficient for practical purposes and has no ill effect on the insecticidal properties of the arsenate of lead. On adding this mixture of arsenate of lead and ½ of 1 per cent of tannin to water in the orchard proportions of 1 pound to 50 gallons I find that after shaking thoroughly and mixing them and then leaving still for 5 minutes and siphoning off the upper half of the liquid and its contents as in the last test, there remained suspended 88.93 per cent as against 31.91 per cent when tannin was not used. At the end of 10 minutes there was suspended 84.45 per cent as against 10.04 per cent when tannin was not used. At the end of 20 minutes 81.08 per cent. At the end of 40 minutes 74.75 per cent. At the end of 80 minutes 62.67 per cent. At the end of 140 minutes 47.70 per cent. At the end of 200 minutes 41.75 per cent as against 1.13 per cent at the end of 200 minutes when no tannin was used.

The value of the comparative settling tests as outlined above is that they offer simple means of determining the physical qualities or fitness of the material.

The active principle of tannin is tannic acid and the tannin mentioned above contains about 60 per cent of tannic acid. In another test, therefore, I used a sample of arsenate of lead to which I added three tenths of 1 per cent of chemically pure tannic acid—$C_4H_{10}O_9$—and in this way obtained substantially the same result as when ½ of 1 per cent of tannin was used.

Since suspensibility generally is a function of fineness I believe that the added tannin causes the arsenate of lead to become or remain in a very finely divided state which also causes it to have an increased covering capacity on the tree thus effecting a marked economy in the quantity needed for an orchard but I am not sure of this theory and my invention does not depend thereon. Such action of the tannin or tannic acid when added to the arsenate of lead is obviously that of a protective colloid for the particles of said insecticide. The use of such protective colloids in other connections is admittedly well known, but I believe it to be new to apply same to the specific field in hand. As illustrated in the case of the ingredients just named as being added by me to the arsenate of lead, such protective colloid must be chemically inert relatively to such arsenate. Tannin and tannic acid are also of course of organic origin.

Assuming, however, the correctness of the foregoing theory, the action of the small percentage of tannin is that of a deflocculating agent, the use of which in this particular connection I believe to be original with me and entirely unique.

As a corollary to such increased suspensibility, due to the very finely divided state in which the arsenate of lead is caused to form and is maintained by the addition of such deflocculating agent, not only are the spreading and covering qualities of the lead arsenate improved when applied to foliage, but, after drying, such arsenate is not as readily washed off as when prepared as heretofore in a form in which the particles tend to agglomerate, thus resulting in an uneven distribution upon being sprayed. In other words, when such finely divided uniformly distributed product is dried it forms a continuous film that is naturally more adherent to the surface to which it is applied and will resist the erosive action of water falling in the form of rain to a markedly greater degree.

In order to achieve benefits by the use of my invention it is not necessary that the arsenate of lead to which the tannin is added be chemically pure as various impurities may be present in small or minute quantities without materially diminishing the effect of the tannin.

I find, however, that if there be present in the arsenate of lead a small quantity of litharge or of acetate of lead the increased suspensibility otherwise produced by tannin is not obtained. Minute quantities of litharge present do not affect the result. For instance, in a sample of arsenate of lead in which there was present one tenth of 1 per cent of litharge substantially as good results were obtained by the addition of ½ of 1 per cent of tannin as if the litharge had not been present. With a sample of arsenate of lead in which there was present one tenth of 1 per cent of lead acetate substantially as good results were obtained by the addition of ½ of 1 per cent of tannin as if the acetate of lead had not been present. However, a sample of arsenate of lead containing approximately 1 per cent of litharge was substantially unaffected as to its capacity for remaining suspended in water by the addition of ½ of 1 per cent of tannin. Likewise a sample containing approximately 1 per cent of lead acetate was similarly unaffected by the addition of ½ of 1 per cent of tannin. Some of the commercial methods of manufacturing arsenate of lead leave an excess of free litharge or free lead acetate in the finished product. If the arsenate of lead made by these methods is not properly purified it is put upon the market containing some of these salts. I find, therefore, that some of the arsenates of lead on the market do not lend themselves, because of the impurities contained, to the production of the beneficial results to be obtained by the addition of tannin to pure arsenate of lead.

My invention is not confined in its application to powder arsenate of lead nor to that made by the process set out above for, by whatever process it is made, if it is properly and sufficiently purified, it will lend itself to my discovery and more especially so if it is reduced to fine soft particles before tannin is added.

I find it convenient to add the dry powdered tannin or tannic acid to the prepared powdered arsenate of lead but it may be that equally good results can be obtained by adding the tannin or tannic acid to the arsenate of lead at some intermediate stage in the process of manufacture or even subsequent to its mixture with the water. Numerous other changes, variations and deviations from the details set out above may be resorted to without departing from my invention.

I claim as my invention:

1. A mixture of arsenate of lead containing less than one per cent of free litharge, and tannin.

2. A mixture of arsenate of lead containing less than one per cent of free lead acetate, and tannin.

3. A mixture of arsenate of lead, and one half of one per cent of tannin by weight.

4. A mixture of arsenate of lead, and sufficient tannin to increase the persistence of suspensibility of the arsenate of lead in water.

5. The method of increasing the persistence of suspensibility of arsenate of lead in water consisting in adding one half of one per cent of tannin to powdered arsenate of lead.

6. The method of increasing the persistence of suspensibility in water of arsenate of lead, consisting in mixing tannin therewith in the dry powdered form.

7. A mixture of tannin and the precipitate formed by mixing lead acetate and arsenic acid.

8. An insectitude of which the principal active ingredient is arsenate of lead with less than one per cent of free lead acetate and less than one per cent of free litharge and more than three tenths of one per cent of tannic acid.

9. A mixture of dry, soft, bulky, powdered arsenate of lead, and approximately one half of one per cent of tannin by weight.

10. An insectitude composition comprising lead arsenate and a deflocculating agent, said composition being readily suspendable in water for spraying and having improved spreading and covering qualities when thus applied, and forming an adherent dry film resistant to the erosive action of water.

11. An insecticide composition comprising lead arsenate and a deflocculating agent intermixed therewith, the percentage of said agent being relatively small.

12. An insecticide composition comprising lead arsenate and a deflocculating agent intermixed therewith, the amount of said agent being less than 10 per cent of the amount of arsenate of lead in the mixture.

13. The herein described product comprising lead arsenate particles intimately associated with a colloid of organic origin.

14. The herein described product consisting of a water-insoluble insectitude material and incorporated therewith, a relatively small quantity of an organic substance capable of serving as a protective colloid for the particles of said insecticide.

15. A lead arsenate insecticide having the particles thereof coated with an organic protective colloid, the amount of said colloid totalling but a fraction of a per cent by weight of the arsenate compound.

16. The process of treating a previously precipitated water-insoluble insecticide with a solution or emulsion of a small quantity of an organic substance capable of serving as a protective colloid.

17. The process of treating a previously precipitated finely divided lead arsenate with a solution or emulsion of a small quantity of an organic substance capable of serving as a protective colloid.

Signed by me this 2 day of November, 1921.

HARRY B. GOODWIN.